United States Patent
Williams (10) Patent No.: US 10,767,853 B2
(45) Date of Patent: Sep. 8, 2020

(54) OVERHEAD CABLE MANAGEMENT SYSTEM WITH INTEGRATED LIGHTING

(71) Applicant: Telect, Inc., Liberty Lake, WA (US)

(72) Inventor: Wayne E. Williams, Liberty Lake, WA (US)

(73) Assignee: Telect, Inc., Liberty Lake, WA (US)

( * ) Notice: Subject to any disclaimer, the term of this patent is extended or adjusted under 35 U.S.C. 154(b) by 55 days.

(21) Appl. No.: 15/820,729

(22) Filed: Nov. 22, 2017

(65) Prior Publication Data

US 2018/0094803 A1 Apr. 5, 2018

Related U.S. Application Data

(63) Continuation of application No. 14/209,923, filed on Mar. 13, 2014, now Pat. No. 9,841,179.

(51) Int. Cl.
*F21V 33/00* (2006.01)
*H02G 3/04* (2006.01)
*H02G 3/06* (2006.01)
*G02B 6/38* (2006.01)
*F21S 4/20* (2016.01)
*F21Y 113/00* (2016.01)
(Continued)

(52) U.S. Cl.
CPC ......... *F21V 33/006* (2013.01); *H02G 3/0437* (2013.01); *H02G 3/0608* (2013.01); *F21S 4/20* (2016.01); *F21Y 2103/10* (2016.08); *F21Y 2113/00* (2013.01); *F21Y 2115/10* (2016.08); *G02B 6/3897* (2013.01); *G02B 6/4452* (2013.01); *G02B 6/4461* (2013.01); *H02G 3/045* (2013.01); *H02G 3/0475* (2013.01); *H02G 3/34* (2013.01)

(58) Field of Classification Search
CPC ........ F21V 33/006; F21S 4/20; G02B 6/3897; G02B 6/4452; G02B 6/4461; H02G 3/045; H02G 3/0475; H02G 3/34; H02G 3/0437; H02G 3/0608
See application file for complete search history.

(56) References Cited

U.S. PATENT DOCUMENTS 5,499,170 A * 3/1996 Gagne ..................... F21S 8/032
362/153
6,033,088 A 3/2000 Contigiani
(Continued)

OTHER PUBLICATIONS

Office action for U.S. Appl. No. 14/209,923, dated Dec. 30, 2016, Williams, "Overhead Cable Management System With Integrated Lighting", 17 pages.

(Continued)

*Primary Examiner* — Arman B Fallahkhair
(74) *Attorney, Agent, or Firm* — Lee & Hayes, P.C.

(57) ABSTRACT

A cable management system may comprise a longitudinal trough with a plurality of lights disposed on an underside of the trough. A power connector may be disposed at an end of the trough communicatively coupled to the plurality of lights. The cable management system may also comprise a second trough or one of a plurality of cable management components, each with a plurality of lights disposed on an underside and a power connector communicatively coupled to the pluralities of lights. The first trough, the second trough, and/or the plurality of cable management components may mate together to form a continuous circuit.

20 Claims, 7 Drawing Sheets

(51) Int. Cl.
*F21Y 103/10* (2016.01)
*F21Y 115/10* (2016.01)
*G02B 6/44* (2006.01)
*H02G 3/34* (2006.01)

(56) References Cited

U.S. PATENT DOCUMENTS

| | | | |
|---|---|---|---|
| 6,065,849 A | 5/2000 | Chen | |
| 6,305,109 B1* | 10/2001 | Lee | G02B 6/0068 |
| | | | 40/546 |
| 7,267,461 B2* | 9/2007 | Kan | F21V 5/002 |
| | | | 362/373 |
| 7,303,310 B2* | 12/2007 | You | F21S 8/031 |
| | | | 362/219 |
| 7,824,056 B2 | 11/2010 | Madireddi et al. | |
| 7,854,527 B2* | 12/2010 | Anderson | F21V 3/00 |
| | | | 362/133 |
| 8,104,920 B2 | 1/2012 | Dubord | |
| 8,220,953 B1* | 7/2012 | Moore | F21S 8/04 |
| | | | 362/217.01 |
| 8,545,045 B2* | 10/2013 | Tress | F21V 33/0012 |
| | | | 315/185 R |
| 8,616,420 B2 | 12/2013 | Schriner | |
| 8,764,220 B2 | 7/2014 | Chan et al. | |
| 8,777,448 B2 | 7/2014 | Shimizu et al. | |
| 9,097,411 B2* | 8/2015 | Guilmette | F21V 21/00 |
| 9,121,597 B2* | 9/2015 | Snagel | F21S 8/038 |
| 9,228,708 B2* | 1/2016 | Dings | F21S 2/005 |
| 2002/0114155 A1 | 8/2002 | Katogi et al. | |
| 2007/0000201 A1 | 1/2007 | Kennedy et al. | |
| 2008/0298058 A1 | 12/2008 | Kan et al. | |
| 2011/0090681 A1* | 4/2011 | Hobson | H05B 33/0818 |
| | | | 362/217.05 |
| 2011/0254146 A1* | 10/2011 | Cho | H01L 24/05 |
| | | | 257/692 |
| 2011/0273877 A1* | 11/2011 | Reed | F21S 2/005 |
| | | | 362/235 |
| 2015/0260935 A1 | 9/2015 | Williams | |

OTHER PUBLICATIONS

Office action for U.S. Appl. No. 14/209,923, dated Feb. 2, 2016, Williams, "Overhead Cable Management System With Integrated Lighting", 13 pages.

Office action for U.S. Appl. No. 14/209,923, dated May 8, 2017, Williams, "Overhead Cable Management System With Integrated Lighting", 14 pages.

Office action for U.S. Appl. No. 14/209,923, dated Aug. 15, 2016, Williams, "Overhead Cable Management System With Integrated Lighting", 20 pages.

* cited by examiner

OVERHEAD CABLE MANAGEMENT SYSTEM WITH INTEGRATED LIGHTING

CROSS REFERENCE TO RELATED APPLICATIONS

This is a continuation application which claims priority to commonly assigned, co-pending U.S. patent application Ser. No. 14/209,923, filed Mar. 13, 2014. Application Ser. No. 14/209,923 is fully incorporated herein by reference.

BACKGROUND

In the telecommunication industry, computing facilities (e.g., central offices, data centers, server rooms, remote cell sites, and the like) often use an overhead cable management system to route connectivity cables, such as optical fibers, within the computing facility or from the computing facility to another. Cables may be routed within a computing facility from one piece of equipment (e.g., patch, splice, cross-connect, amplifier, transceiver, or other fiber, copper, and/or power connectivity equipment) to another piece of equipment, or from one piece of equipment within the computing facility to outside the computing facility. Computing facilities also require a lighting system to allow employees, installers, technicians, security personnel, and the like to perform their duties. The lighting system generally comprises light structures (e.g., fluorescent lights) disposed in and/or suspended from the ceiling.

Typical overhead cable management systems used to route cables may comprise an assortment of connectable components with a width dimension perpendicular to the path of cable travel of 12", 24", or even 36" in order to route large volumes of cables. These systems are typically elevated above the computing equipment via mounting hardware that mounts the overhead cable management system to the equipment racks, the ceiling, mounting rods, or other support structures.

When a high volume of cables require routing, the overhead cable management system may be substantially large and wide to provide sufficient cable connections to the equipment below the cable management system. Thus, the overhead cable management system may obstruct the light fixtures on the ceiling, limiting their effectiveness at transmitting light to the working space of the facility. Personnel that rely on the light fixtures to perform their duties may find it difficult to work when the light fixtures are blocked or partially blocked.

Accordingly, there remains a need for improved overhead cable management systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, overhead cable management systems often obstruct light fixtures, which can lead to insufficient lighting and a corresponding waste of energy.

This disclosure is directed to an overhead cable management system with integrated lighting. The integrated lighting may supplement or replace other lighting in the facility. In some examples, the cable management system may comprise a trough with a first sidewall, a second sidewall, and bottom wall forming a substantially U-shaped profile. The trough may be alternatively referred to as a fiber optic cable routing component. The trough may comprise an integrated light source such as a plurality of high-efficiency light emitting diodes (LEDs), disposed underneath and/or formed into the trough. In some examples, the LEDs may be disposed in a channel on an underside of the trough.

In some examples, the light source may receive power from a power connector communicatively coupled to the light source disposed proximate to an end of the trough. The power connector may be configured to mate with a second power connector disposed on another cable management component. For instance, the power connector may mate with a second power connector disposed on a trough coupler or on a second trough.

In some embodiments, the overhead cable management system may comprise a plurality of components that are easily mated together, such as troughs, couplers, T-junctions, reducers, elbows, and the like. The plurality of components may each comprise a plurality of lights on their undersides such that mating the plurality of components together creates a continuous electrical circuit to provide power to all of the plurality of lights. In some embodiments, the plurality of components may have a conductive path (e.g., wires) without lights or with lights only along a portion of the lengths of the components.

In some examples, power may be provided to the plurality of lights via equipment disposed in the computing facility. For instance, the plurality of lights may be communicatively coupled to a power distribution unit such as a rack mounted power distribution unit or a wall mounted power distribution unit. In some examples, power may be provided to the plurality of lights from outside the computing facility, such as from a utility power line or solar panel. Power may be provided to the plurality of lights by a single power source or multiple power sources.

In some embodiments, an energy-efficient lighting system integrated into the underside of an overhead cable management system may provide lighting for a computing facility in a cost effective manner without obstruction issues. The overhead cable management system with integrated lighting may provide primary lighting, secondary lighting, variable task lighting, and/or emergency lighting for the computing facility. In some examples, the plurality of lights may receive power responsive to a sensor communicatively coupled to the plurality of lights and/or power supply. An overhead cable management system with a light source, such as high-efficiency LEDs, communicatively coupled to a sensor may provide a substantially energy-efficient manner for lighting areas disposed below the overhead cable management system, ultimately lowering the energy costs of the computing facility.

Multiple and varied example implementations and embodiments are described throughout. However, these examples are merely illustrative and other implementations and embodiments of an overhead cable management system with integrated lighting may be implemented without departing from the scope of the disclosure. For instance, the implementations, or portions thereof, may be rearranged, combined, used together, omit one or more portions, be omitted entirely, and/or may be otherwise modified to arrive at variations on the disclosed implementations.

Illustrative Overhead Cable Management Trough

Figure 1:
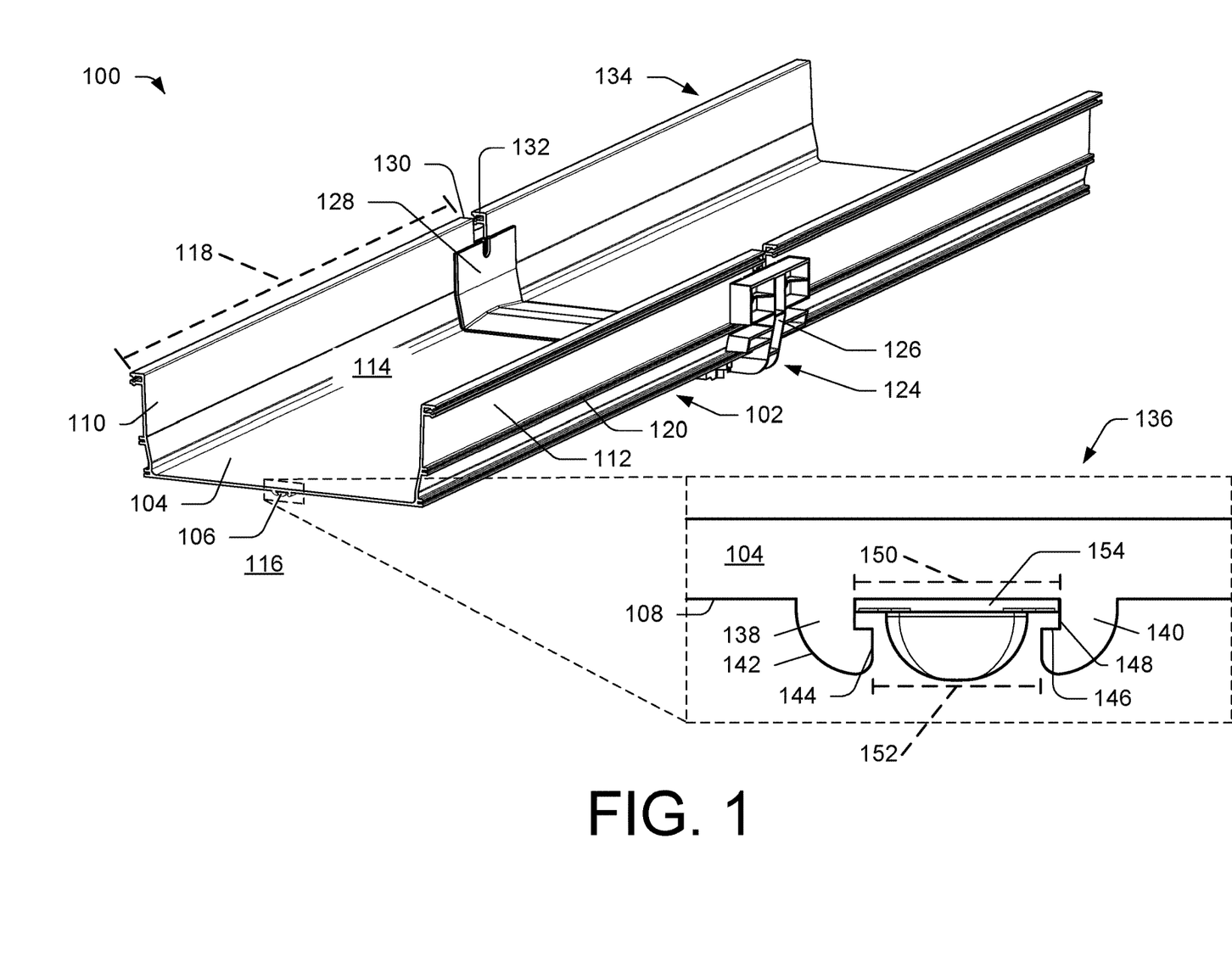
FIG. 1 illustrates an example overhead cable management system comprising a first trough coupled to a second trough and at least one light disposed in a mounting channel.

FIG. 1 illustrates an example overhead cable management system 100 comprising a trough 102 with a bottom wall 104 and at least one light 106 coupled to an underside 108 of the bottom wall 104. In some examples, the trough 102 may comprise a first sidewall 110 extending upwardly from a first side of the bottom wall 104. The trough 102 may comprise a second sidewall 112 extending upwardly from a second side of the bottom wall 104, opposite the first sidewall 110.

In some embodiments, the bottom wall 104, the first side wall 110 and the second sidewall 112 may form a substantially U-shaped profile which may define an interior space 114 and an exterior space 116. The U-shaped profile may comprise fully rounded corners, partially rounded corners, square corners, or any combinations or variations thereof. The U-shaped profile may extend a longitudinal length 118 defining a length of the trough 102. In some examples, the first sidewall 110 and/or the second sidewall 112 may include a plurality of protrusions 120 extending into the exterior space 116. The plurality of protrusions 120 may provide a means for mounting a coupler 124 onto the trough 102. For instance, the coupler 124 may have corresponding protrusions or members on an outer portion 126 facing inwardly that mate with spaces between the plurality of protrusions 120, securing the coupler 124 onto the trough 102.

In some examples, the plurality of protrusions 120 may provide a means for mounting many other types of cable management components to the trough 102, as discussed in greater detail below with regard to FIG. 5. Additionally or alternatively, the plurality of protrusions 120 may provide a means for attaching mounting hardware to the trough 102, such as for mounting the trough 102 onto a top portion of an equipment rack, to a ceiling mounting rod, or to metal framing, such as framing manufactured by Unistrut®, of Wayne, Mich.

In some examples, the coupler 124 may comprise an inner portion 128 that mates with the outer portion 126 to define a substantially U-shaped gap. An end 130 of the trough 102 may insert into the U-shaped gap at a first side of the coupler 124. A second end 132 of a second trough 134 may insert into a second side of the coupler 124, opposite the first side. As described above, the first and/or second troughs 102 and/or 134 may mate to the coupler 124 by mating with the plurality of protrusions 120. Additionally or alternatively, the ends 130 and 132 of the first and second troughs 102 and 134 may be secured to the coupler 120 via other coupling methods, such as notch-fittings, snap-fits, clips, stops, tabs-and-slots, or magnets that correspond with a complimentary feature on the coupler 124. Any types and/or combination of coupling methods may be used to mate the first and/or second troughs 102 and/or 134 to the coupler 124.

In some embodiments, the at least one light 106 may be disposed in a mounting channel 136 on the underside 108 of the bottom wall 104. In some embodiments, the mounting channel 136 may be defined by a first flange 138 extending parallel to a second flange 140. The first and second flanges 138 and 140 may protrude downwardly from the bottom wall 104. The mounting channel 136 may extend the entire longitudinal length 118 of the trough 102 or a portion of the longitudinal length 118.

In some embodiments, the flanges 138 and/or 140 may comprise a curved outer edge 142 extending from the bottom wall 104 towards the center of the channel 136. The outer edge 142 may terminate at a lower inner edge 144 that extends from the outer edge 142 towards the bottom wall 104. In some examples, the lower inner edge 144 may extend all the way to the bottom wall 104. In other examples, such as that shown in FIG. 1, the lower inner edge 144 may extend up to an inner shoulder 146. The inner shoulder 146 may extend back towards the outer edge 142, terminating at an upper inner edge 148, which extends towards and terminates at the bottom wall 104.

In some examples, the shape of the flanges 138 and/or 140 may define the mounting channel 136 with an upper gap with a width 150 that is greater than a lower gap width 152. In other words, the mounting channel 136 may have a substantially T-shaped cavity. In some examples, the at least one light 106 may be mated with a mounting material, such as a printed circuit board 154. In some examples, the printed circuit board 154 may be a flexible circuit board. The printed circuit board 154 may have a width corresponding with the width of the upper gap 150 such that the printed circuit board 154 may mount snugly in the mounting channel 136 with merely a friction fitting. In some embodiments, the printed circuit board 154 may be coupled to a surface of the mounting channel 136 with an adhesive. In some embodiments, the printed circuit board 154 may be flexible to further facilitate placement in the mounting channel 136.

Some examples of the first and second flanges 138 and 140 may omit and/or combine at least one of the outer edge 142, the lower inner edge 144, the inner shoulder 146, and the upper inner edge 148. Further, each of these portions of the first and second flanges 138 and 140 may be curved, straight (e.g., a beveled or chamfered edge) and/or combinations thereof (e.g., an S-curve). There are many possible shapes that the first and second flanges 138 and 140 may comprise in order to define the mounting channel 136.

Figure 2A:
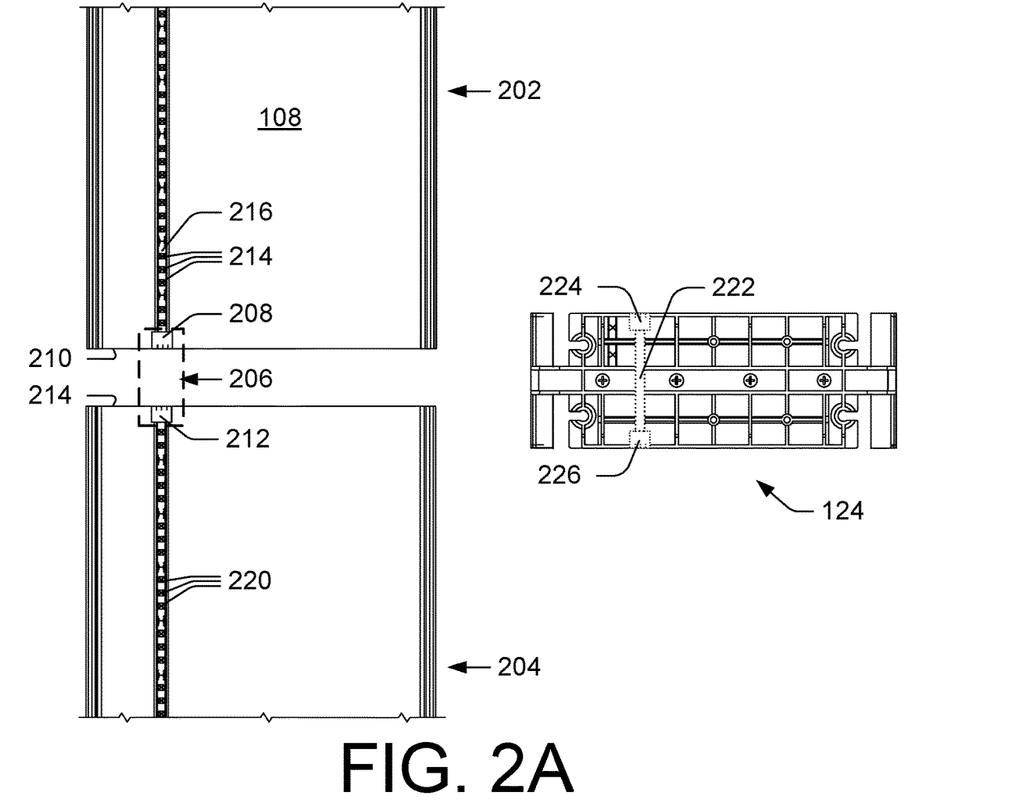
FIGS. 2A and 2B illustrate an example overhead cable management system comprising a connection system with a first and second power connector.
Figure 2B:
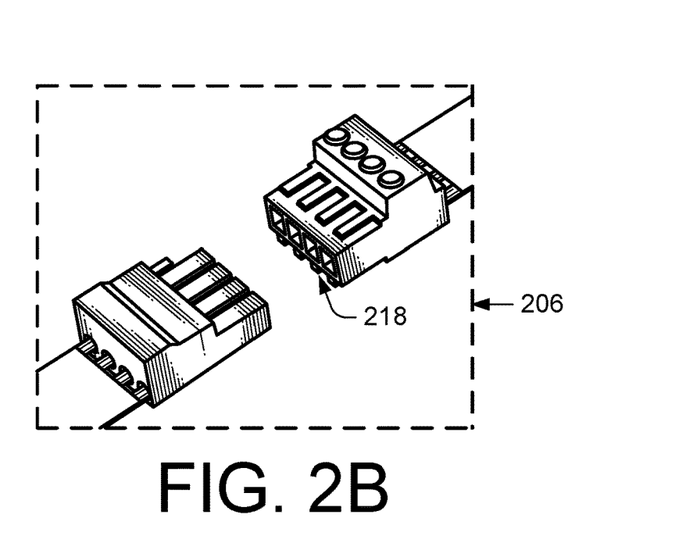

FIGS. 2A and 2B illustrate an overhead cable management system 200 comprising a first trough 202 configured to mate with a second trough 204. In some examples, the overhead cable management system 200 may comprise a connection system 206 comprising a first power connector 208 disposed at an end 210 of the first trough 202 and a second power connector 212 disposed at an end 214 of the second trough 204. In some examples, the first and/or second power connectors 208 and/or 212 may comprise a pluggable PCB connector such as those manufactured by PHOENIX CONTACT GmbH & Co. KG., of Blomberg, Germany. An assortment of power connectors with a variety of connection methods, orientations, and additional features may be implemented. For instance, the power connectors 208 and/or 212 may be configured to make a screw connection, a spring connection, a crimp connection, an insulation displacement connection, an insulation piercing connection, a snap-fit connection, a friction-fit connection, a magnetic connection, and/or combinations thereof. In some examples, the power connectors 208 and/or 212 may have additional features such as locking latches, locking screws and/or color coding.

In some embodiments, the overhead cable management system 200 may comprise a plurality of LEDs 216 disposed on the underside 108 of the first trough 202. In some examples, the plurality of LEDs 216 may be substantially evenly spaced along a printed circuit board 218 or the plurality of LEDs 216 may be positioned in evenly spaced groups, such as groups of three LEDs. In some examples, the plurality of LEDs 216 may be high-efficiency LEDs such as 3528 SMD LEDs manufactured by LEDLuxor, of Hong Kong. The plurality of LEDs 216 may be secured to the first trough 202 with adhesive, fasteners, heat press, friction fitting, or may merely fit loosely in the mounting channel 136. In some examples, the plurality of LEDs 216 may be easily replaced in the event of a failure. For example, the printed circuit board 218 may be slid out from the mounting channel 136 and a replacement printed circuit board with a strip of LEDs may be slid into the mounting channel 136.

In some examples, the plurality of LEDs 216, (e.g., adhesive backed 3528 SMDs manufactured by LEDLuxor) may be applied to the trough 202 via a manufacturing process including rolling a roll of LEDs along a selected wall of the trough 202. An adhesive on the back of the roll of LEDs or applied to the adhering surface may mate the LEDs to the adhering surface of the mounting channel 136 of the selected wall. The roll of LEDs may be rolled along a desired length of the trough to press the plurality of LEDs 136 against the adhering surface at the point of contact between the roll of LEDs and the selected wall.

In some embodiments, the plurality of LEDs 216 may be removed from the trough 202. For instance, the plurality of LEDs 216 may be removed in order to replace a faulty LED. An edged tool may be moved along a length of a selected wall while slid between the plurality of LEDs 216 and the adhering surface to decouple the plurality of LEDs 216 from the adhering surface, removing the plurality of LEDs 216 from the channel.

In some examples, the trough 202 may include accommodations for the roller and/or edged tool. The accommodations may be molded into the trough 202 integral with or separate from the mounting channel 136, such that the roller and/or edged tool are guided by the mounting channel 136 and/or trough 202. In some examples, the accommodations may be a slot, a protrusion, a magnetic guide, and/or a guide rail. The roller and/or edged tool may be customized to fit integrally into the channel, such as with a spring and pin.

In some examples, the plurality of LEDs 216 disposed on the underside 108 of the first trough 202 may illuminate when provided with a voltage through the first power connector 208. The voltage may be a direct current (DC) voltage or an alternating current (AC) voltage. The voltage may be provided through wires or contacts which may be at least partially embedded in the printed circuit board 218 or separate from the printed circuit board 218. The power connector 208 may be communicatively coupled to the plurality of LEDs 216. In some examples, the plurality of LEDs 216 may illuminate when provided with an AC voltage source, such as a 120V wall outlet or a DC voltage source, such as a ±48V or ±24V terminal on a power distribution panel.

In some examples, the light source disposed on the underside 108 of the trough 202 may comprise one or more fluorescent, incandescent, and/or phosphorescent bulbs. The light source disposed on the underside 108 of the trough 202 may comprise a plurality of lights or a single light. In some embodiments, a continuous conductive track may be disposed in the mounting channel 136. At least one light 106 may be removabley positioned on the conductive track, providing a reconfigurable system similar to "track lighting".

In some examples, the first power connector 208 may be secured proximate to the end 210 of the first trough 202, oriented with a face 220 substantially parallel with the end 210 of the first trough 202. The power connector 208 may be positioned with the face 220 substantially flush with the end 210 of the first trough 202, protruding from the end 210 of the first trough 202, or inset from the end 210 of the first trough 202. The end 210 of the first trough 202 may have an inset cavity or area formed into the trough material for securing the power connector 208 to the end 210. The power connector 208 may be secured to the trough 202 during the extrusion process or during a post-extrusion process.

In some embodiments, the second power connector 212 may be disposed on the end 210 of the second trough 204. In some examples, the first power connector 208 may align with and mate with the second power connector 212 when the first trough 202 is coupled to the second trough 204, forming a continuous power circuit between a first light source on the first trough 202 and a second light source on the second trough 204. The first power connector 208 may be configured to mate with the second power connector 212 using any of the aforementioned mating methods.

Additionally or alternatively, in some examples, the coupler 124 may provide an intermediate path 224 for coupling the first power connector 208 to the second power connector 212 and providing a continuous circuit for the first and second light sources. For instance, the coupler 124 may define a conductive path between connectors 226 and 228 disposed on the coupler 124. The intermediate path 224 may provide a connection between the first power connector 208 on the first trough 202 and the second power connector 212 on the second trough 204. In some examples, a power connector may be disposed on multiple types of cable management components to provide communicative coupling between lights disposed on the cable management components.

In some examples, the trough 202 may comprise shielding to prevent electromagnetic interference (EMI) or electromagnetic conductance (EMC) from occurring between the lighting component and/or its associated power supply and cables routed within the walls of the trough 202, due to their proximity to each other. The shielding may comprise a foil, mesh, or tape. The shielding may comprise any material suitable for disrupting or obstructing EMI/EMC such as copper, aluminum, or steel. The shielding may be employed between a wall of the trough 202 and the lighting component and/or its associated electrical supply to prevent EMI and/or EMC. Additionally or alternatively, EMI/EMC shielding may be integrated into rigid or flexible circuit boards on which the lighting component is mounted. In such examples, shielding may be provided by a shielding layer (or layers) within a multi-layer circuit board.

Figure 3A:
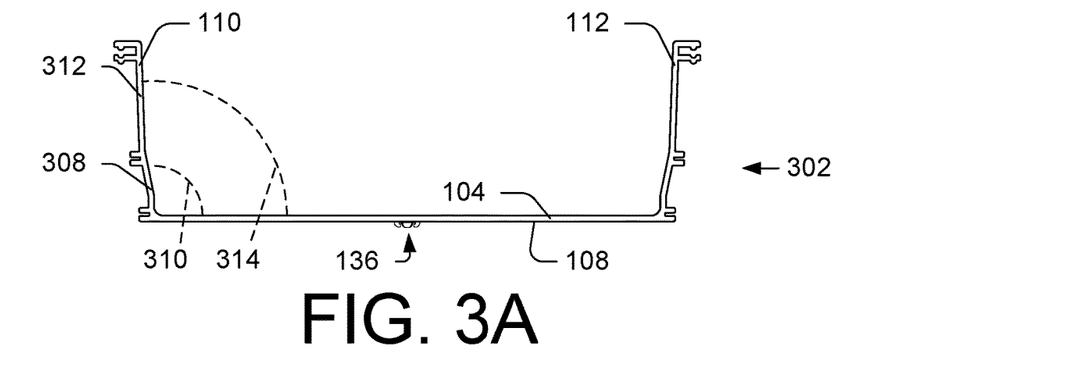
FIGS. 3A-C illustrate cross sectional elevation views of three different embodiments of an example overhead cable management system.
Figure 3B:
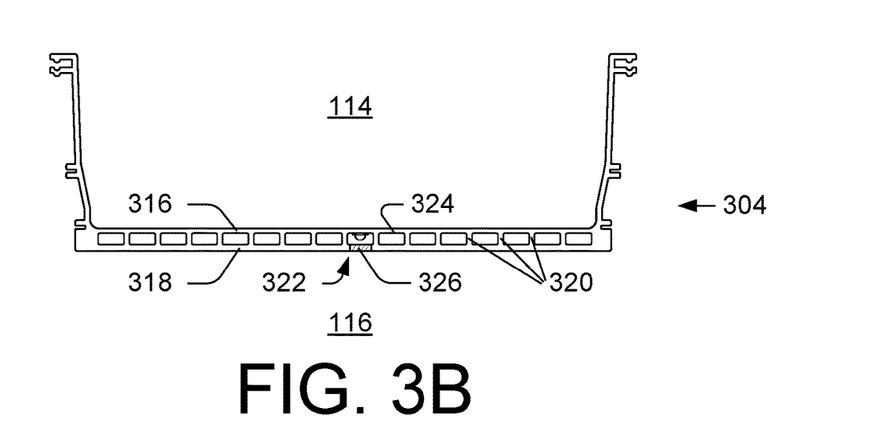
Figure 3C:
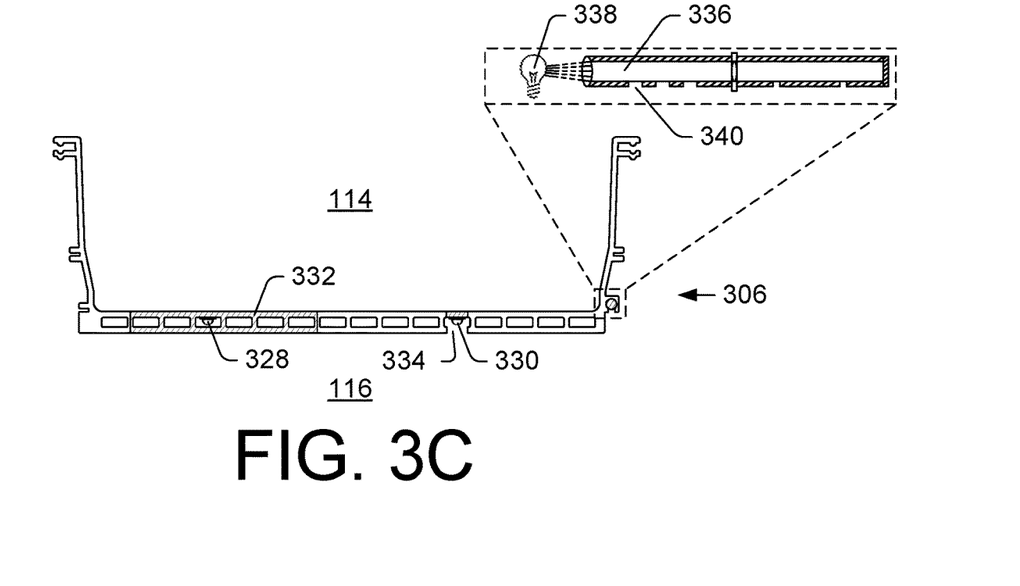

FIGS. 3A-C illustrate an overhead cable management system 300 comprising a first embodiment of a trough 302, a second embodiment of a trough 304, and a third embodiment of a trough 306.

As illustrated in FIG. 3A, the first trough 302 may comprise the first side wall 110 and the second side wall 112 extending from the bottom wall 104 to form a substantially U-shaped profile. The first and second sidewalls 110 and 112 may be substantially planar, curved or may comprise multiple planes and/or curves. For instance, the first sidewall 110 may have a lower portion 308 extending from the bottom wall 104 at a first angle 310. The lower portion 308 may transition into an upper portion 312, the upper portion 312 forming a second angle 314 with the bottom wall 104. In some examples, the first angle 310 may be greater than 90° (e.g., such as) 101° and the second angle 314 may be between 85° and 95° (e.g., such as 92°). Some embodiments of the first and/or second sidewalls 110 and/or 112 may include more portions than the lower portion 308 and the upper portion 312. The first trough 302 may comprise a mounting channel 136 comprising first and second flanges 138 and 140 protruding from the underside 108 of the bottom wall 104. In other examples, the mounting channel 136 may be recessed into the underside 108 such that there are no protrusions from the underside 108.

As illustrated in FIG. 3B, the second trough 304 may comprise the bottom wall 104 with an upper layer 316 and a lower layer 318. In some examples, the upper and lower layers 316 and 318 may be adjoined in a spaced apart relation by a plurality of support ribs 320.

In some examples, the at least one light 106 may be mounted in a mounting channel 322 comprising an underside 324 of the upper layer 316, and at least a portion of one of the plurality of support ribs 320. The lower layer 318 of the bottom wall 104 may have a portion 326 comprising a transparent or translucent material. The portion 326 may be disposed directly below the at least one light 106, such that the light generated by the at least one light 106 may pass through the portion 326 and illuminate the exterior space 116 below the trough 304. In other examples, the portion 326 may be omitted during an extrusion process or removed after the extrusion process, to provide a transmission path for the at least one light 106 to an area below the trough 304.

As illustrated in FIG. 3C, the third trough 306 may comprise the bottom wall 104 with the upper layer 316 and the lower layer 318. The trough 306 may comprise a first strip of lights 328 and a second strip of lights 330 disposed on the underside 324 of the upper layer 316. However, the trough 306 may comprise even more strips of lights, as discussed in greater detail below with regard to FIGS. 4A-D.

In some examples, the trough 306 may comprise a transparent or translucent section 332. The transparent or translucent section 332 may comprise a portion of the bottom wall 104 including the upper layer 316, the lower layer 318, and/or any number of the plurality of support ribs 310. In some embodiments, the first strip of lights 328 may be disposed on at least a portion of the underside 324 of the upper layer 316 that comprises the transparent or translucent section 332. In some examples, at least a portion of light that may emanate from the first strip of lights 328 may pass through the transparent or translucent section 332, illuminating the interior space 114 defined by the substantially U-shaped profiled. In some embodiments, light emanating from the first strip of lights 328 may illuminate the exterior space 116 below the trough 306 and the interior space 114 through the transparent or translucent section 332. In some examples, the printed circuit board 156 may comprise a transparent or translucent material to provide a path of light transmission to the interior space 114. In some embodiments, the transparent or translucent section 332 may serve to diffuse the light and provide a more uniform light distribution. The transparent or translucent section 332 may be extruded simultaneously with the rest of the trough 306 as a single unit, or the trough 306 may be extruded in separate portions and assembled (e.g., via tongue and groove, adhesive, or heat press) as a post-extrusion process.

In some embodiments, the third trough 306 may include the second strip of lights 330 disposed on the underside 324 of the upper layer 316. A gap 334 in the lower layer 318 may be disposed directly below the second strip of lights 330 to provide a path of transmission for light emanating from the second strip of lights 330 to an area below the trough 306. In some examples, the gap 334 may be formed in the lower layer 316 during a post-extrusion cutting process. In other examples, the gap 334 may be formed during the extrusion process. For instance, the gap 334 may be formed into an extrusion die used to extrude the trough 306. In some embodiments, the trough 306 may only comprise one of the first strip of lights 328 or the second strip of lights 330. In other examples, the trough 306 may comprise both the first strip of lights 328 and the second strip of lights 330.

In some embodiments, the at least one light may be disposed on the first and/or second side walls 110 and/or 112. In some examples, the at least one light may comprise a light pipe 336 extending all or a portion of the length of the trough 306. The light pipe 336 may receive light at an end from a light source 338, such as an LED. The light pipe 336 may comprise a transparent or translucent material, such as polymer or glass, to transmit light from the light source a length of the trough 306. An opening 340 may be disposed below the light pipe 336 to disperse light from the light pipe 336 to an area below the trough 306. Multiple openings may be disposed below the light pipe 336 in a spaced apart relation, or a single opening may be positioned below the light pipe 336 in order to effectively disperse light. In some examples, the light pipe 336 disposed on the trough 306 may couple with a second light pipe disposed on a second trough. The single light source 338 may provide light to multiple troughs through a coupling of multiple light pipes.

In some examples the troughs 302, 304, and/or 306 may comprise a rigid or semi-rigid, extrudable plastic, such as acrylonitrile butadiene styrene (ABS), polyvinyl chloride (PVC), or the like. In some examples, the troughs 302, 304, and/or 306 may comprise a material with an Underwriters Laboratory 94-V0 flammability rating, RoHS compliancy, and/or any other standard desired by the computing facility in which the troughs 302, 304, and/or 306 are to be installed.

In some embodiments, the U-shaped profile comprising the bottom wall 104, the first side wall 110, and the second side wall 112 may have an average wall thickness of about 0.05 inches to about 0.25 inches, inclusively. In some specific embodiments, the U-shaped profile may have an average wall thickness of about 0.100 inches, 0.115 inches, 0.125 inches, 0.135 inches, 0.145 inches, 0.155 inches, a thickness between the aforementioned thicknesses, or any thickness that provides a suitable strength and weight to the troughs 302, 304, and/or 306 such that they may be mountable overhead and may route a substantial volume of cables. In some examples, the wall thickness of the troughs 302, 304, and/or 306 may be determined at least in part by the properties of the material comprising the troughs 302, 304, and/or 306. Further, in some examples, the wall thickness may vary throughout the cross section, being thicker in some areas and thinner in others.

FIGS. 4A-D illustrate multiple configurations of an example overhead cable management system 400.

Figures 4A, 4B:
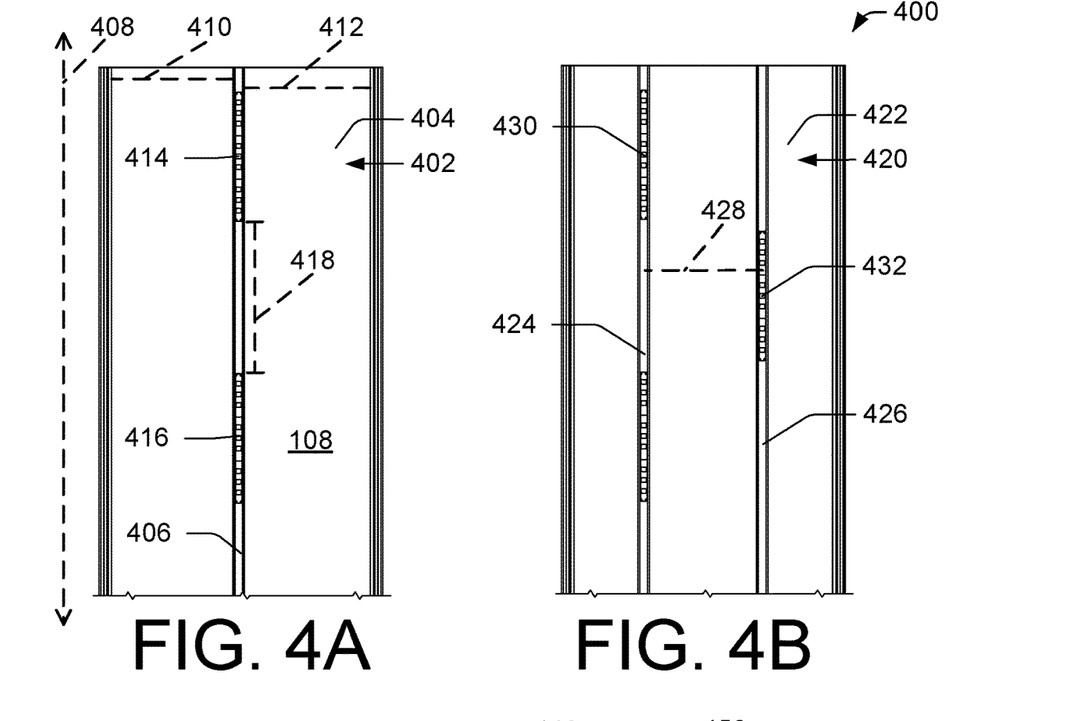
FIGS. 4A-D illustrate four different configurations of an example overhead cable management system.

FIG. 4A illustrates an example lighting configuration 402 on a first trough 404. Lighting configuration 402 comprises a single mounting channel 406 disposed on the underside 108 of the bottom wall 104 and extending in the longitudinal direction 408. The mounting channel 406 may be disposed a first distance 410 from the first sidewall 110 and a second distance 412 from the second sidewall 112. In some examples, the first distance 410 may be substantially equal to the second distance 412 such that the mounting channel 406 may be centrally located on the underside 108, between the first side wall 110 and the second sidewall 112.

In some embodiments, a plurality of lights may be disposed in the mounting channel 406. The plurality of lights may comprise a first strip of LEDs 414 and a second strip of LEDs 416. The first and second strips of LEDs 414 and 416 may be longitudinally aligned with each other within the mounting channel 406.

In some examples, the first strip of LEDs 414 may be spaced a longitudinal distance 418 apart from the second strip of LEDs 416. The longitudinal distance 418 between the first and second strips of LEDs 414 and 416 may provide a location for attaching an additional overhead cable management component. For instance, the longitudinal distance 418 may define a gap in the plurality of lights for attaching a mounting bracket to the first trough 404. Additionally or alternatively, an exit ramp component may be attached to the first trough 404 at the distance 418. In some examples (not shown in this figure), the first trough 404 may comprise a single continuous strip of LEDs running the entire longitudinal length of the trough 404.

FIG. 4B illustrates an example lighting configuration 420 on a second trough 422. Lighting configuration 420 may comprise a first mounting channel 424 and a second mounting channel 426 disposed on the underside 108 of the bottom wall 104. The first and second mounting channels 424 and 426 may be spaced a lateral distance 428 apart and may run substantially parallel to each other in the longitudinal direction 408. A first plurality of lights 430 may be disposed within the first mounting channel 424. A second plurality of lights 432 may be disposed within the second mounting channel 426. In some examples, the first plurality of lights 430 may be spaced the lateral distance 428 from the second plurality of lights 432.

In some examples, the first plurality of lights 430 may have a configuration identical to the second plurality of lights 432. Alternatively, the first plurality of lights 430 may have a configuration substantially different than the second plurality of lights 432. For instance, as illustrated in FIG. 4B, the first plurality of lights 430 may comprise a first strip of LEDs spaced a longitudinal distance apart from a second strip of LEDs (similar to the plurality of lights illustrated in FIG. 4A). In contrast, the second plurality of lights 432 may comprise only a single strip of LEDs. Many configurations of the first plurality of lights 430 and the second plurality of lights 432 may be implemented according to the specific application of the overhead cable management.

Figure 4C:
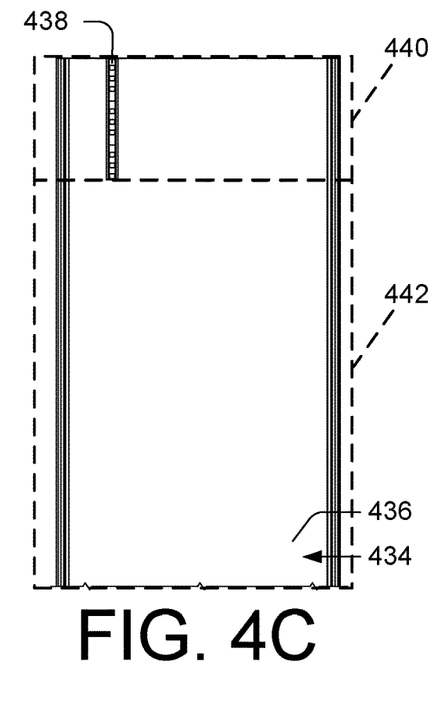

FIG. 4C illustrates an example lighting configuration 434 on a third trough 436. Lighting configuration 434 comprises a mounting channel 438 extending a first length 440 of the underside 108 in the longitudinal direction 408. A plurality of lights may be disposed in the mounting channel 438. The third trough 436 may have a second length 442 of the underside 108 in the longitudinal direction 408 without any lights and/or any mounting channel. The second length 442 of the underside 108 may provide a surface for mounting additional overhead cable management components.

Figure 4D:
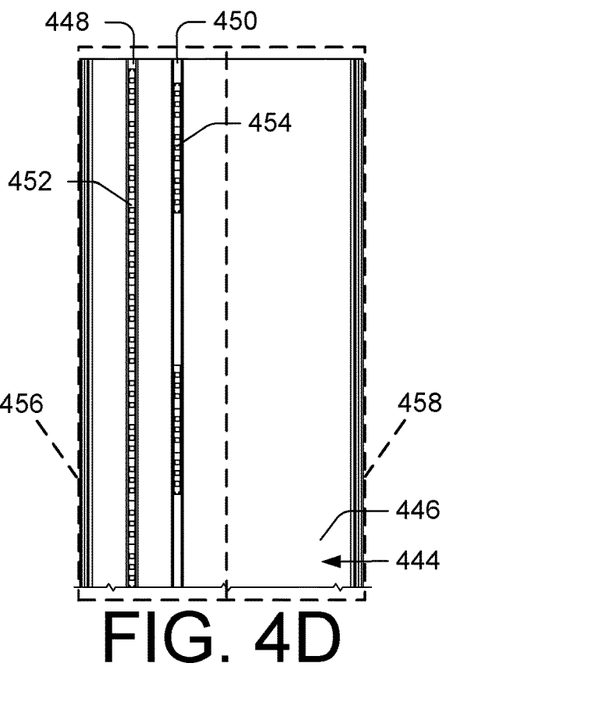

FIG. 4D illustrates an example lighting configuration 444 on a fourth trough 446. Lighting configuration 444 may comprise a first mounting channel 448 and a second mounting channel 450 disposed on the underside 108 of the bottom wall 104. In some embodiments, a first plurality of lights 452 may be disposed in the first mounting channel 448 and a second plurality of lights 454 disposed in the second mounting channel 450. The first and second plurality of lights 452 and 454 may have substantially similar configurations or different configurations.

In some examples, the first and second mounting channels 448 and 450 may be disposed on a first lateral side 456 of the underside 108 of the fourth trough 446 such that a second lateral side 458 of the underside 108 is substantially bare. The second lateral side 458 of the underside 108 may provide a surface suitable for attaching or mounting additional cable management components.

In some embodiments, different aspects and features of the lighting configurations 402, 420, 434, and 444 may be omitted, duplicated, and/or combined to create additional configurations. Although lighting configurations with up to two mounting channels are shown, lighting configurations with any number (e.g., three, four, five, six, etc.) of mounting channels may also be implemented including any of the features or characteristics previously discussed.

In some examples, a lighting configuration may be implemented based at least in part on the specific application of the cable management component. For instance, some cable management components may have multiple mounting channels, each one corresponding to a different function. A first mounting channel may have strips of lights for providing primary lighting for a computing facility while a second mounting channel may have an individual light to provide back up or emergency lighting. The lighting configuration may also be implemented to avoid interference with installation hardware.

In some embodiments, the light source/s may be located on the underside 108 in a particular configuration in order to provide lighting to a specific area. For instance, overhead cable management system 400 may comprise a light source disposed above a work station, a selected equipment rack, multiple equipment racks, a selected aisle, multiple aisles, or even the entire work space of the facility. In some examples, the light source/s may provide lighting only to a specific area. In other examples, the light source/s may provide lighting to a specific area in addition to other areas.

Figure 5:
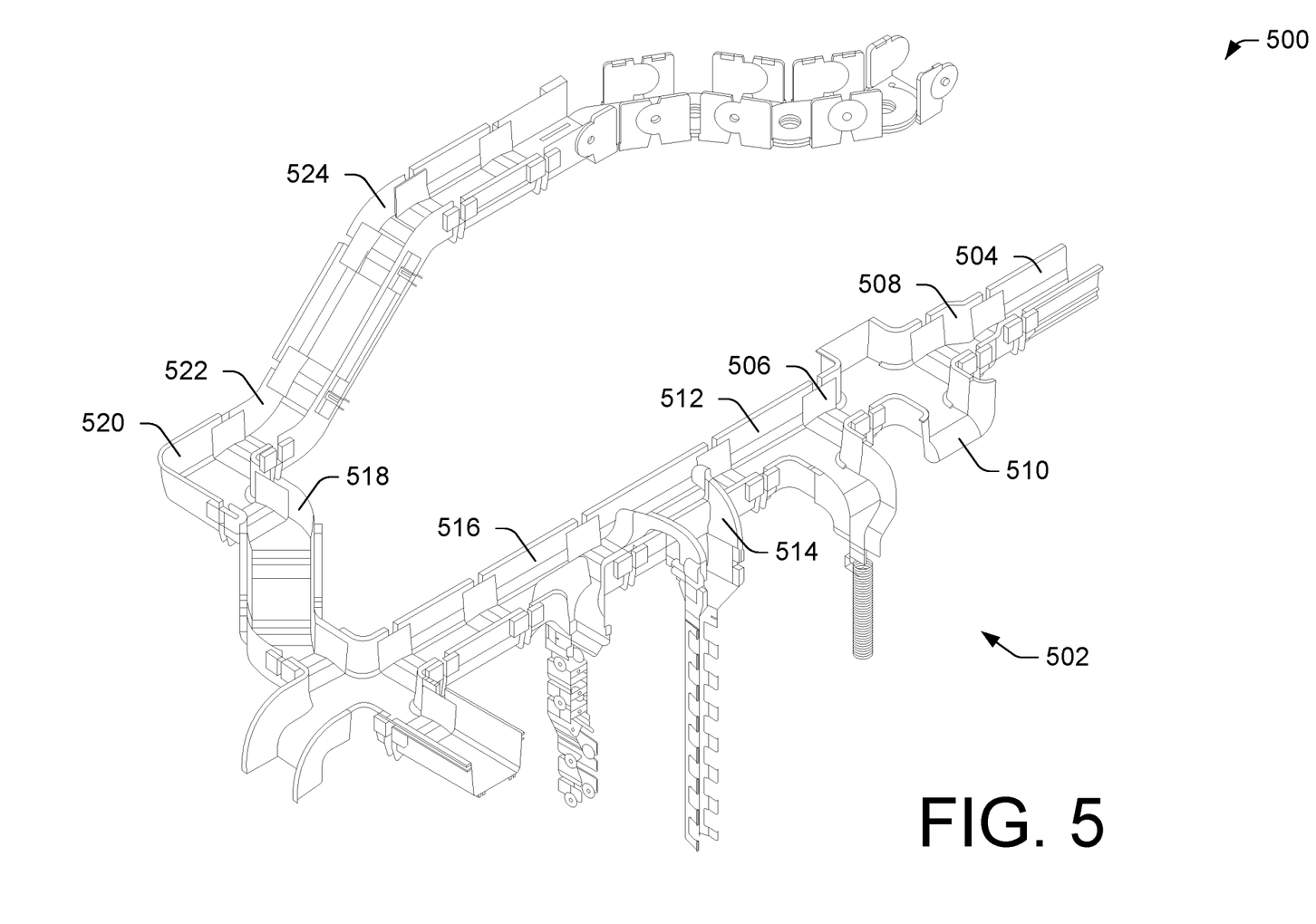
FIG. 5 illustrates an example overhead cable management system comprising a plurality of cable management components.

FIG. 5 illustrates an example overhead cable management system 500 comprising a plurality of cable management components 502. By way of example and not limitation, the plurality of cable management components 502 may comprise a trough 504, a coupler 506, a reducer 508, a trumpet attachment 510, a T-junction 512, an off-ramp 514, a center drop 516, an elbow 518, an L-junction 520, an upsweep 522, a downsweep 524, or any combinations thereof. The overhead cable management system 500 may implement any of the plurality of cable management components 502, and any multiple of each of the plurality of cable management components 502, to provide a cable management system that corresponds with the equipment configuration in the computing facility in which the cable management system is to be installed.

Each of the plurality of cable management components 502 in the overhead cable management system 500 may comprise at least one light 106 disposed on an underside of the component. Each of the plurality of cable management components 502 may comprise the power connector 208 communicatively coupled to the at least one light 106 such that the plurality of cable management components 502 may comprise a single circuit (or multiple continuous circuits) when mated together to form the overhead cable management system 500.

In some examples, the overhead cable management system 500 may comprise a portion of components with at least one light 106 disposed on an underside, and a portion of components without any lights. In some instances, the components comprising the at least one light 106 may form a continuous circuit separate from the components without any lights. In other instances, the components without any lights may still comprise a conductive path (e.g. wires, contacts, a flexible circuit), such that the components without any lights and the components with the at least one light 106 may be communicatively coupled and may together form a continuous circuit.

Figure 6:
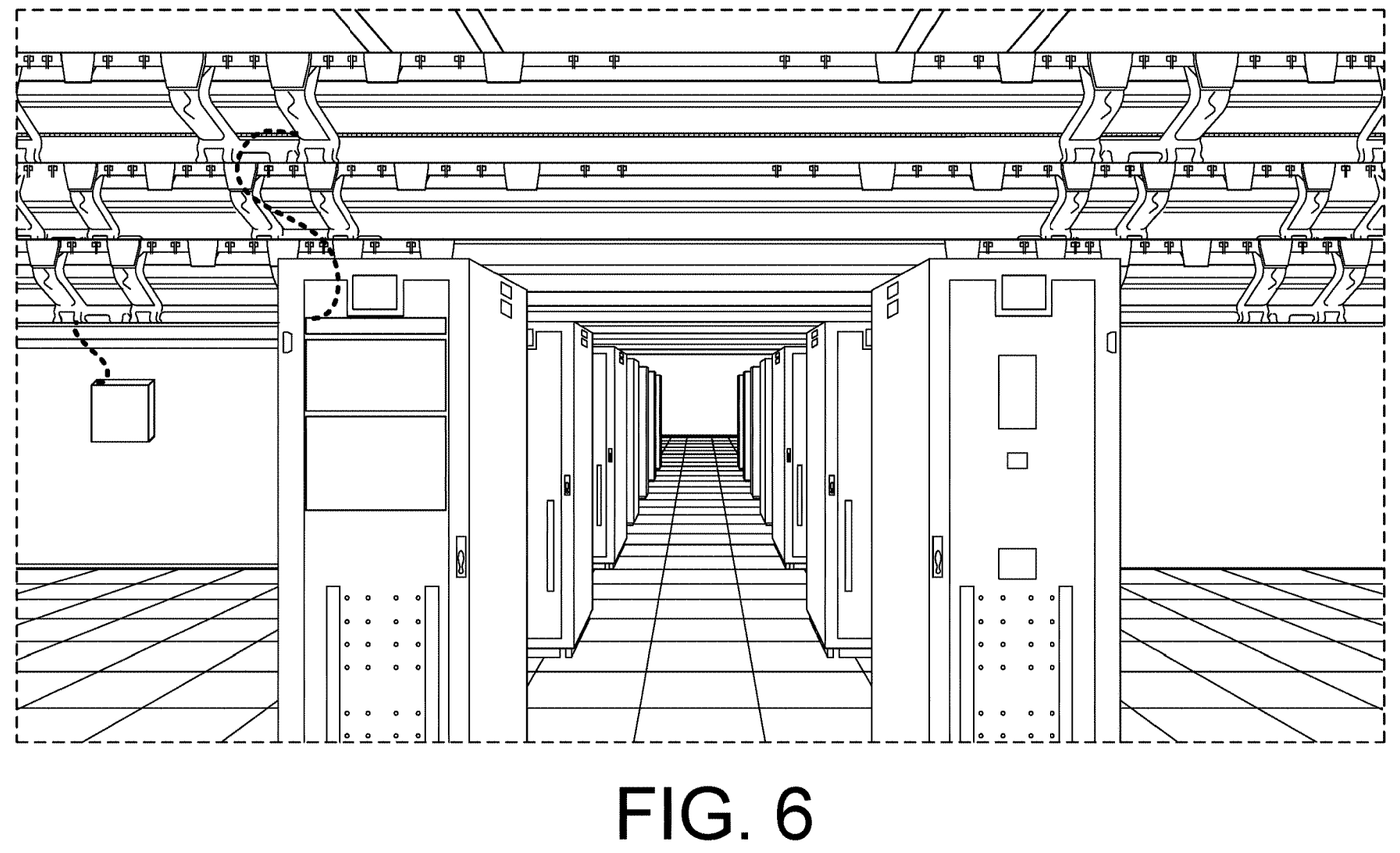
FIG. 6 illustrates an example overhead cable management system comprising a rack mountable power distribution unit and a wall mountable power distribution unit.

FIG. 6 illustrates an example overhead cable management system 600. In some examples, the overhead cable management system 600 may comprise a plurality of cable management components (e.g., troughs, couplers, etc.), at least one of which may comprise at least one light and a power connector to form an electrical circuit. In some examples, the circuit may be provided power from equipment or a device located within a computing facility 602. For example, the overhead cable management system 600 may comprise a rack mounted power distribution panel 604, such as an HPGMT10 Dual-Feed 1 RU secondary distribution panel manufactured by Telect, of Liberty Lake, Wash., communicatively coupled with the at least one light disposed on one of the plurality of cable management components. In some examples, the overhead cable management system 600 may receive power from a distribution unit within the same computing facility 602. In other examples, the overhead cable management system 600 may receive power from a distribution unit in a separate computing facility.

In some examples, power to the overhead cable management system 600 may be provided from a wall mounted distribution panel 606. In some embodiments, power to the overhead cable management system 600 may be provided from at least one of a bus bar, a battery, a rectifier, a utility power line, or a solar panel disposed within or outside the computing facility 602. A single power distribution unit may provide power to the overhead cable management system 600 or multiple power distribution units. For instance, the components of the overhead cable management facility may each comprise two mounting channels on their undersides with a strip of LEDs, or other lights, disposed in each channel (similar to FIG. 4D), forming two separate continuous circuits. The first continuous circuit may receive power from the rack mounted distribution panel 604 and may provide primary lighting for the computing facility 602. The second continuous circuit may receive power from the bus bar of a dual feed battery distribution and fuse bay and may provide backup lighting for the computing facility 602.

Figure 7:
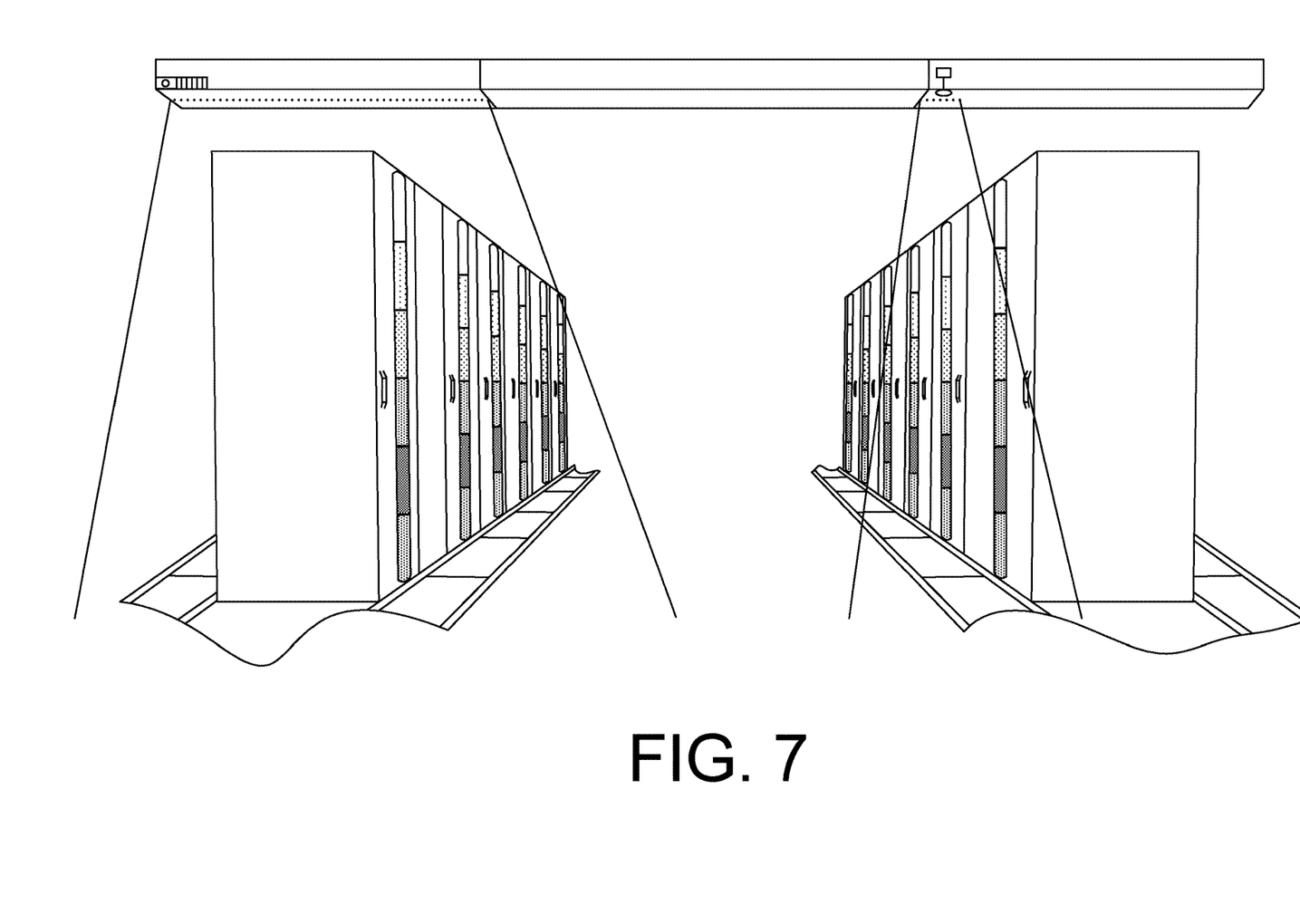
FIG. 7 illustrates an example overhead cable management system in an example computing facility environment.

FIG. 7 illustrates an example overhead cable management system 700 comprising a first trough 702 and/or a second trough 704.

In some examples, the first trough 702 may comprise a first plurality of lights 706 disposed on the underside 108. The first plurality of lights 706 may receive power from a battery pack 708 disposed on the first trough 702. In some examples, the first plurality of lights 706 may provide variable brightness to a first area 710 of a facility 712 (e.g., a computing facility). For instance, the first plurality of lights 706 may be communicatively coupled to a light sensor 714. The light sensor 714 may be disposed on the trough 702 or the light sensor 714 may be separate from the trough 702. The light sensor 714 may detect the level of light from other sources (e.g., natural light, light fixtures, etc.) present in the facility 712 and may adjust an intensity or brightness of the first plurality of lights 706 accordingly to provide suitable light for a technician, installer, security personnel, or the like. In some embodiments, the intensity may be controlled by controlling a voltage applied to the first plurality of lights 706. In some examples, the first plurality of lights 706 may provide primary lighting to the facility 712 in an energy-efficient manner.

The second trough 704 may comprise a second plurality of lights 716 disposed on at least a portion of the underside 108. The second plurality of lights 716 may be communicatively coupled to a motion sensor 718. In some examples, the motion sensor 718 may be positioned above an equipment rack, a piece of equipment, a control board, or any other area within the facility 712. The second plurality of lights 716 may receive power when the motion sensor 718 detects an event below the second trough 704, providing "task lighting" to a second area 720 of the facility 712.

Many other configurations of cable management components, lights, sensors, and/or power supplies may be implemented to comprise the overhead cable management system 700 to correspond to a specific configuration of the facility 712. The overhead cable management system may provide an energy-efficient lighting system with an unobstructed light transmission path to the pertinent areas of the facility 712. Any of the aforementioned plurality of components, coupling methods, lighting configurations, other characteristics and features, and/or combinations thereof may be implemented to provide the overhead cable management system with integrated lighting 700.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:
1. A cable management trough comprising:
   a first side wall and a second side wall each extending from a bottom wall to form a substantially U-shaped cross-section, each of the first side wall, the second side wall, and the bottom wall extending a longitudinal length, the first side wall including a first end proximate to the bottom wall and a second end distal from the bottom wall, the second side wall including a first end proximate to the bottom wall and a second end distal from the bottom wall, the first end of the first side wall and the first end of the second side wall being a first distance apart, the second end of the first side wall and the second end of the second side wall being a second distance apart, and the first distance being less than the second distance;
   a channel extending at least a portion of the longitudinal length within the bottom wall, the channel defined by:
      a horizontal upper surface of the bottom wall and a horizontal lower surface of the bottom wall with the channel being located between the horizontal upper surface and the horizontal lower surface, the horizontal upper surface and the horizontal lower surface being continuous between the first side wall and the second side wall; and
      a plurality of vertical ribs that connect the horizontal upper surface and the horizontal lower surface, the channel being located between a first vertical rib of the plurality of vertical ribs and a second vertical rib of the plurality of vertical ribs; and
   at least one light disposed in the channel.

2. The cable management trough of claim 1, wherein the first side wall, the second side wall, the bottom wall, and the channel comprise an extruded plastic.

3. The cable management trough of claim 2, wherein at least a portion of one of the first side wall, the second side wall, or the bottom wall comprises a transparent or translucent material.

4. The cable management trough of claim 3, wherein the transparent or translucent material is located beneath the at least one light.

5. The cable management trough of claim 1, further comprising a power connector disposed proximate to an end of the cable management trough and electrically coupled to the at least one light.

6. The cable management trough of claim 1, further comprising a sensor electrically coupled to the at least one light, the sensor configured to detect an event occurring below the cable management trough.

7. A cable trough comprising:
a bottom wall, a first side wall, and a second side wall, the bottom wall, the first side wall and, the second side wall extending a longitudinal length and being arranged such that a cross-section thereof is substantially U-shaped, the first side wall and the second side wall protruding away from the bottom wall in a first direction and the first side wall or the second side wall having a lower portion and an upper portion, the lower portion forming a first angle with the bottom wall that is greater than 90 degrees and the upper portion forming a second angle with the bottom wall that is between about 85 and about 95 degrees, the first side wall including a first end proximate to the bottom wall and a second end distal from the bottom wall, the second side wall including a first end proximate to the bottom wall and a second end distal from the bottom wall, the first end of the first side wall and the first end of the second side wall being a first distance apart, the second end of the first side wall and the second end of the second side wall being a second distance apart, and the first distance being less than the second distance;
a channel extending at least a portion of the longitudinal length within the bottom wall, the bottom wall having a first horizontal surface and a second horizontal surface with the channel being located between the first horizontal surface and the second horizontal surface; and
a plurality of lights disposed at least partially in the channel.

8. The cable trough of claim 7, wherein the bottom wall comprises a plurality of vertical ribs that connect the first horizontal surface and the second horizontal surface, the channel being located between a first vertical rib of the plurality of vertical ribs and a second vertical rib of the plurality of vertical ribs.

9. The cable trough of claim 8, wherein at least one of the first horizontal surface or the second horizontal surface has an opening proximate to the plurality of lights.

10. The cable trough of claim 7, further comprising a power connector disposed proximate to an end of the cable trough electrically coupled to the plurality of lights.

11. A system comprising a plurality of troughs, the troughs of the plurality of troughs being cable troughs according to claim 10, wherein the cable troughs comprise a first cable trough and the power connector comprises a first power connector, and
wherein the first power connector is configured to electrically couple to a second power connector disposed on a second cable trough disparate from the first cable trough or to a power supply unit.

12. The cable trough of claim 7, wherein the channel is a first channel, and the plurality of lights is a first plurality of lights, and
wherein the cable trough further comprises a second channel extending a second portion of the longitudinal length within the bottom wall, and a second plurality of lights disposed in the second channel.

13. The cable trough of claim 12, wherein the first plurality of lights is spaced a lateral distance apart from the second plurality of lights.

14. The cable trough of claim 7, wherein the plurality of lights comprises a strip of light emitting diodes.

15. The cable trough of claim 7, wherein the plurality of lights includes:
a first strip of light emitting diodes disposed at least partially in the channel, and
a second strip of light emitting diodes disposed at least partially in the channel, the second strip of light emitting diodes being spaced a longitudinal distance apart from the first strip of light emitting diodes.

16. The cable trough of claim 7, wherein the bottom wall extends continuously from the first side wall to the second side wall.

17. A cable management lighting system comprising:
a plurality of overhead cable routing components, at least one of the plurality of overhead cable routing components having a substantially U-shaped cross section with a first side wall and a second side wall protruding from a bottom wall;
a plurality of coupler components securing the plurality of overhead cable routing components together,
one or more lights disposed within the bottom wall of the at least one of the plurality of overhead cable routing components, the bottom wall having a horizontal upper surface and a horizontal lower surface and the one or more lights being located between the horizontal upper surface and the horizontal lower surface, the horizontal upper surface and the horizontal lower surface being continuous between the first side wall and the second side wall, the first side wall including a first end proximate to the bottom wall and a second end distal from the bottom wall, the second side wall including a first end proximate to the bottom wall and a second end distal from the bottom wall, the first end of the first side wall and the first end of the second side wall being a first distance apart, the second end of the first side wall and the second end of the second side wall being a second distance apart, and the first distance being less than the second distance;
a power connector disposed on at least one end of the at least one of the plurality of overhead cable routing components; and
a power supply communicatively coupled with the one or more lights through the power connector.

18. The system of claim 17, wherein at least one of the plurality of overhead cable routing components comprises a trough, a reducer, a trumpet attachment, a T-junction, an off-ramp, a center drop, an intersection, an elbow, an L-junction, an upsweep, or a downsweep.

19. The system of claim 17, wherein the power supply comprises at least one of a wall mounted power distribution, a rack mounted power distribution unit, a bus bar, a battery, a rectifier, a utility power line, a power terminal, or a solar panel.

20. The system of claim 17, wherein at least one of the plurality of coupler components comprises:
- a substantially U-shaped first portion located in an interior of the at least one of the plurality of overhead cable routing components;
- a substantially U-Shaped second portion located on an exterior of the at least one of the plurality of overhead cable routing components such that the first portion and the second portion define a substantially U-shaped gap that contains the at least one of the plurality of overhead cable routing components; and
- a conductive path with a first connector located on a first side of the at least one of the plurality of coupler components and a second connector located on a second side of the at least one of the plurality of coupler components.

\* \* \* \* \*